US012558772B2

(12) United States Patent
Yasue

(10) Patent No.: US 12,558,772 B2
(45) Date of Patent: Feb. 24, 2026

(54) MARKING DEVICE

(71) Applicant: SHACHIHATA INC., Nagoya (JP)

(72) Inventor: Akinori Yasue, Nagoya (JP)

(73) Assignee: Shachihata Inc., Nagoya (JP)

( * ) Notice: Subject to any disclaimer, the term of this patent is extended or adjusted under 35 U.S.C. 154(b) by 470 days.

(21) Appl. No.: 18/322,640

(22) Filed: May 24, 2023

(65) Prior Publication Data

US 2023/0398679 A1 Dec. 14, 2023

(30) Foreign Application Priority Data

Jun. 14, 2022 (JP) ................................ 2022-095805

(51) Int. Cl.
*B25H 7/04* (2006.01)

(52) U.S. Cl.
CPC .................................. *B25H 7/045* (2013.01)

(58) Field of Classification Search
CPC ................................ B25H 7/04; B25H 7/045
See application file for complete search history.

(56) References Cited

U.S. PATENT DOCUMENTS 3,133,350 A * 5/1964 Benson .................... B25H 7/04 30/296.1
3,148,455 A * 9/1964 Aciego .................. B43K 31/00 33/760
3,191,462 A * 6/1965 Plunske ................... B25D 5/00 408/72 R
3,364,856 A * 1/1968 Lind ........................ B41K 1/40 D18/14
3,446,141 A * 5/1969 Gardiner .................. B41K 3/36 101/103
3,459,484 A * 8/1969 Abrams ............... B43K 5/1845 401/206
6,226,823 B1 * 5/2001 Ma Gee ................... B25H 7/04 7/157
6,824,337 B2 * 11/2004 Pentz ..................... B23Q 5/033 409/234
6,829,989 B2 * 12/2004 Chudy .................... B41F 17/30 101/DIG. 40
11,291,317 B2 * 4/2022 Weitsman .............. B25H 7/045
(Continued)

FOREIGN PATENT DOCUMENTS

GB 2596303 A * 12/2021 ............. B41F 17/30
JP 2002-355777 A 12/2002
JP 2019-217662 A 12/2019

*Primary Examiner* — George B Bennett
(74) *Attorney, Agent, or Firm* — BURR PATENT LAW, PLLC

(57) ABSTRACT

A marking device that targets a fastened member and a fastening member (5,6), the marking device comprising;

a housing that covers the fastening member (5, 6); and a marking member that is coupled to the housing via a support shaft (30) and is swingable toward the fastening member (5, 6), characterized in that when a vector having, as a start point, a marked corner part (MC1) and having the swing center (31) as an end point at is a first vector (V1*a*), and a vector having the marked corner part (MC1) as a start point, and is directed in a direction orthogonal to a central axis (C) of the fastening member (5) and away from the fastening member (5, 6) is a second vector (V2*a*), an angle (θ1) formed by these two vectors (V1*a*, V2*a*) is equal to or greater than 90 degrees and less than 180 degrees.

4 Claims, 14 Drawing Sheets

(56) References Cited

U.S. PATENT DOCUMENTS

| | | | | |
|---|---|---|---|---|
| 12,384,016 | B2 * | 8/2025 | Lu | B25H 7/045 |
| 2009/0148224 | A1 * | 6/2009 | Steiger | G01C 15/00<br>401/198 |
| 2019/0054611 | A1 * | 2/2019 | Reynolds | B25H 7/045 |

* cited by examiner

MARKING DEVICE

TECHNICAL FIELD

The present invention relates to a marking device used when the fastened member such as steel is joined using the fastening member such as a bolt, a nut, and a washer.

BACKGROUND ART

When a fastened member such as steel is joined by a fastening member such as a bolt, a nut, and a washer in steel frame construction, these fastening members are fastened in order of primary fastening, marking, and final fastening. Specifically, first, a nut is rotated at a predetermined torque value to perform primary fastening, and a series of linear marks are put on the fastening member and the fastened member (hereinafter, collectively referred to as "marking object") that are primarily fastened. Subsequently, the final fastening is performed, and a misalignment angle of the linear mark is inspected, whereby the presence or absence of the corotation of the bolt and the nut can be determined.

In general, marking is manually put using a pen or the like, but the work of manually putting marks on a large number of marking objects one by one is burdensome. In a dangerous place such as a high place, a place where an improper posture is forced, and the like, it is difficult to perform accurate marking and to ensure worker's safety if the worker manually puts marks. Therefore, various types of marking devices have been proposed in the past.

Patent Literature 1 describes, as a "fourth embodiment", a marking jig including a felt body rotatably and pivotally supported inside a housing that is a columnar body. In this marking jig, as illustrated in FIG. 16 of the same literature, the tip end part of the felt body moves obliquely upward and comes into contact with a screw or the like that is a marking object. For this reason, the felt body is not sufficiently pressed against a corner part that is a boundary between the screw and a washer and between the washer and a pedestal, and there is a problem that the marking of the corner part is missing or thinned. In particular, in a case where the marking object is a steel plate, a bolt, a nut, a washer, or the like, the corner parts serving as boundaries of those members are vertically connected in a stepwise manner, there is a high possibility that the mark of the corner part is missing in the marking from the obliquely lower side by the felt body.

PATENT LITERATURE

Patent Literature 1: JP 2019-217662 A

SUMMARY OF INVENTION

Technical Problem

An object of the present invention is to solve the above-described conventional problems and to provide a marking device that can perform clear marking without discontinuity even at a corner part.

Solution to Problem

In order to solve the above problem, a marking device that targets, as marking objects, a fastened member and a fastening member fastened to the fastened member, the marking device including: a housing that covers the fastening member; and a marking member that is coupled to the housing via a support shaft and is swingable toward the fastening member with the support shaft as a swing center, characterized in that when a vector having, as a start point, a marked corner part that is a part to which a mark is put in a boundary between the marking objects, and having the swing center as an end point at is a first vector, and a vector having the marked corner part as a start point, and is directed in a direction orthogonal to a central axis of the fastening member and away from the fastening member is a second vector, an angle formed by the first vector and the second vector is equal to or greater than 90 degrees and less than 180 degrees.

It is preferable that the marking member includes a protruding part protruding to the outside of the housing, and a mark is put to the marking object by pressing the protruding part.

It is preferable that the marking device includes: a knock body that is assembled to the housing with an elastic member interposed therebetween, and movable in a base end direction from a tip end of the fastening member; and a regulation part that can regulate operation of the marking member, characterized in that the regulation part regulates rotation of the marking member when the marking device is not in use, and when the marking device is in use, the knock body is pressed in a direction of approaching the fastening member, and thus regulation of the regulation part with respect to the marking member is released.

It is preferable that the marking device includes: a holder that is assembled to the housing with an elastic member interposed therebetween, and is movable in a base end direction from a tip end of the fastening member, characterized in that the holder is provided with a pressing part that can press the marking member, and when the marking device is in use, the holder is pressed in a direction of approaching the fastening member, and thus the pressing part presses the marking member to put a mark on the marking object.

Advantageous Effects of Invention

According to the present invention, it becomes possible to provide a marking device that can perform clear marking without discontinuity even at a corner part.

DESCRIPTION OF EMBODIMENTS

Hereinafter, embodiment for carrying out the invention will be described.

First Embodiment

Figure 1:
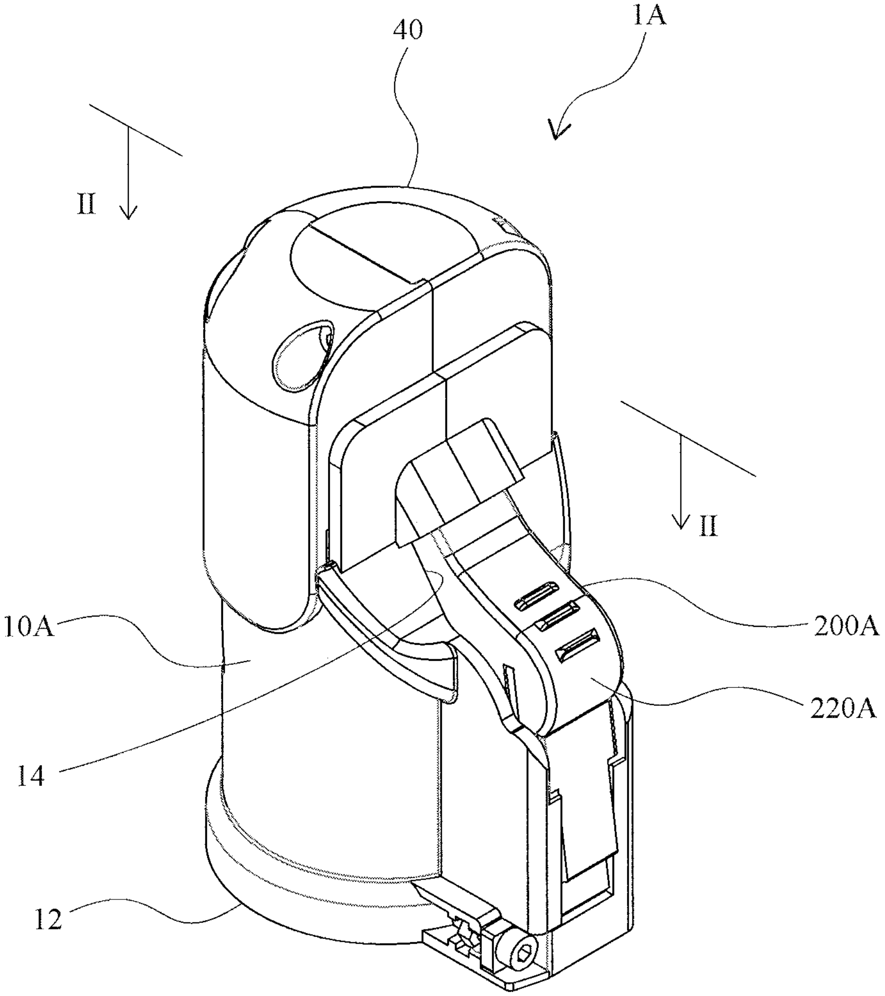
FIG. 1 is a perspective view of a marking device according to a first embodiment.
Figure 2:
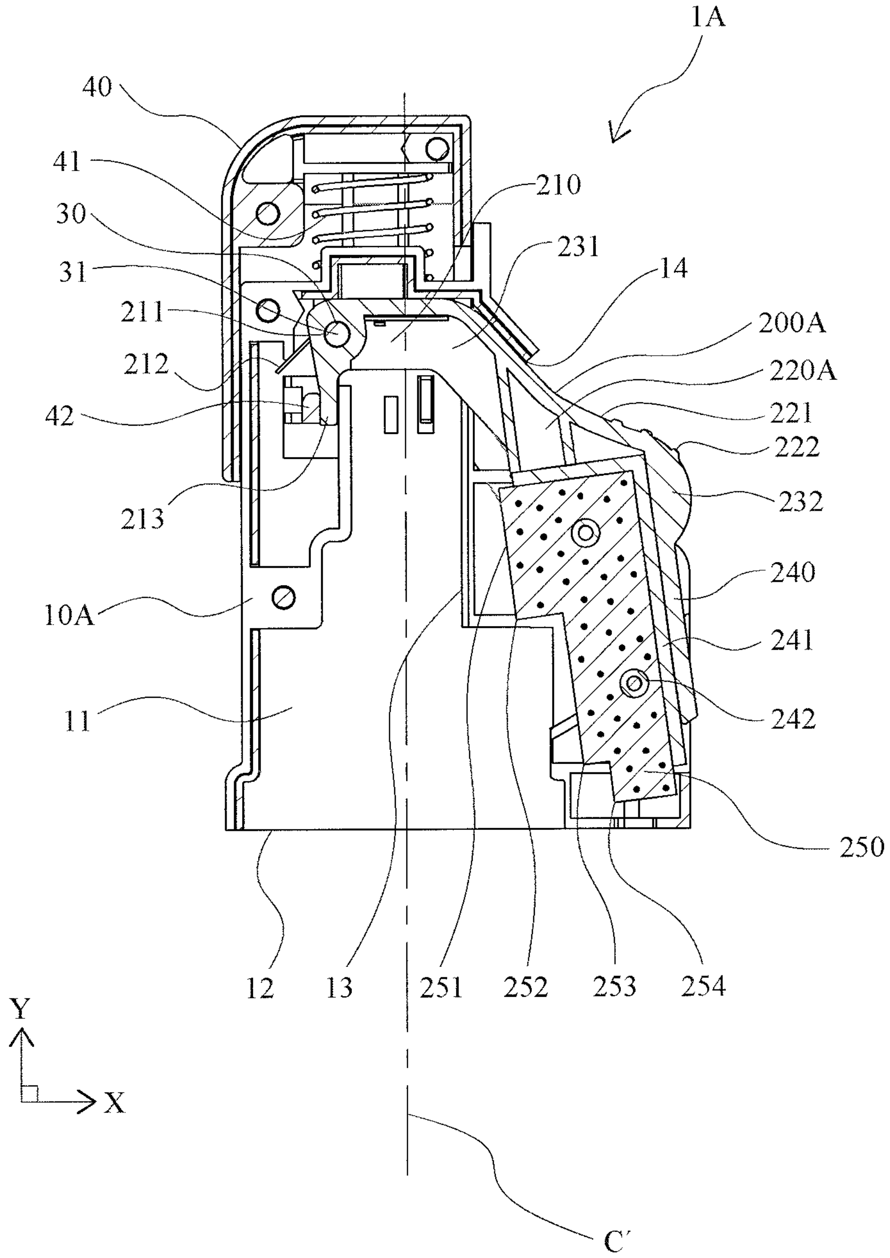
FIG. 2 is a cross-sectional view taken along II-II of FIG. 1.

As illustrated in FIGS. 1 and 2, a marking device 1A of the first embodiment includes a housing 10A having a substantially cylindrical shape as a whole, and a marking member 200A coupled to the housing 10A via a support shaft 30 and swingable in inner and outer directions of the housing 10A with the support shaft 30 as a swing center. The housing 10A of the present embodiment is made of resin. While the material is not limited to this and may be other than resin, when made of resin, the marking device 1A is suitable for outdoor use due to its dustproof, waterproof, and durability, and is lightweight and indestructible.

Figure 3:
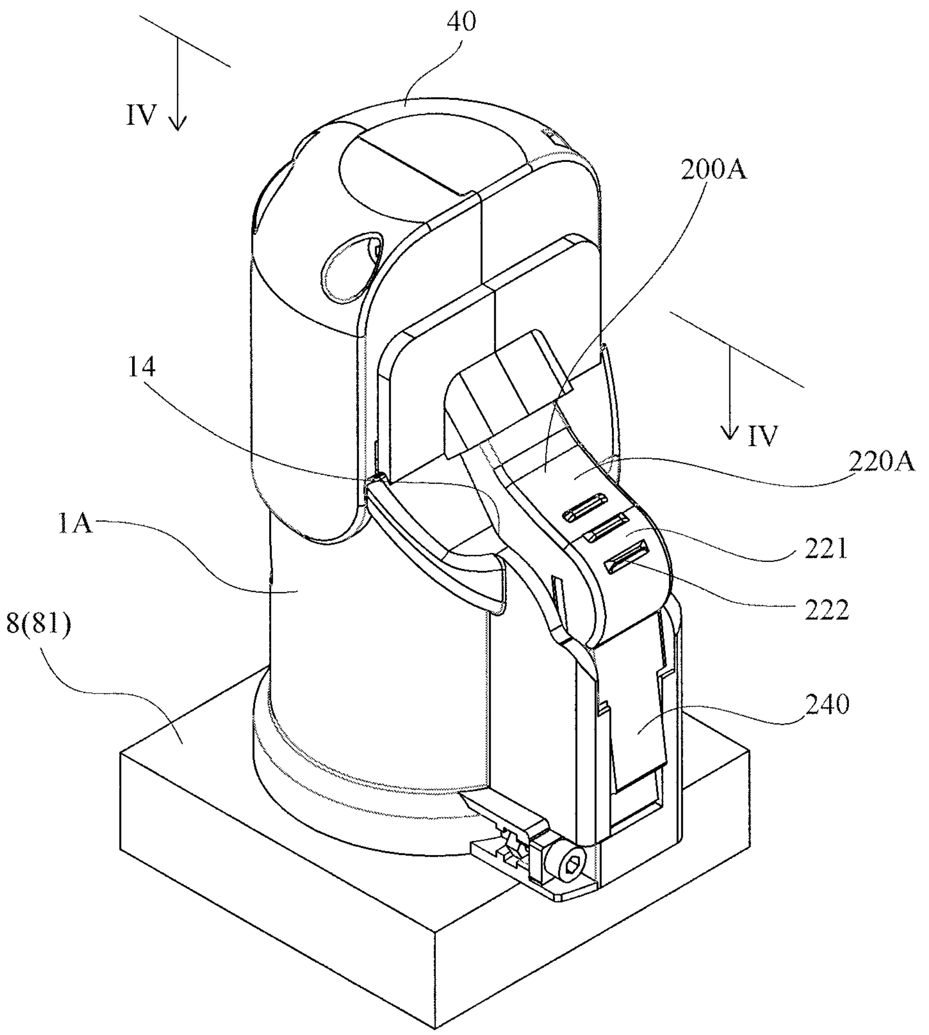
FIG. 3 is a perspective view illustrating a state where the marking device illustrated in FIG. 1 is mounted on a bolt that is a marking object. This figure illustrates a part of a plate-shaped member that is in contact with a washer, of two plate-shaped members that are fastened members, and does not illustrate the other plate-shaped member and a head of the bolt.
Figure 4:
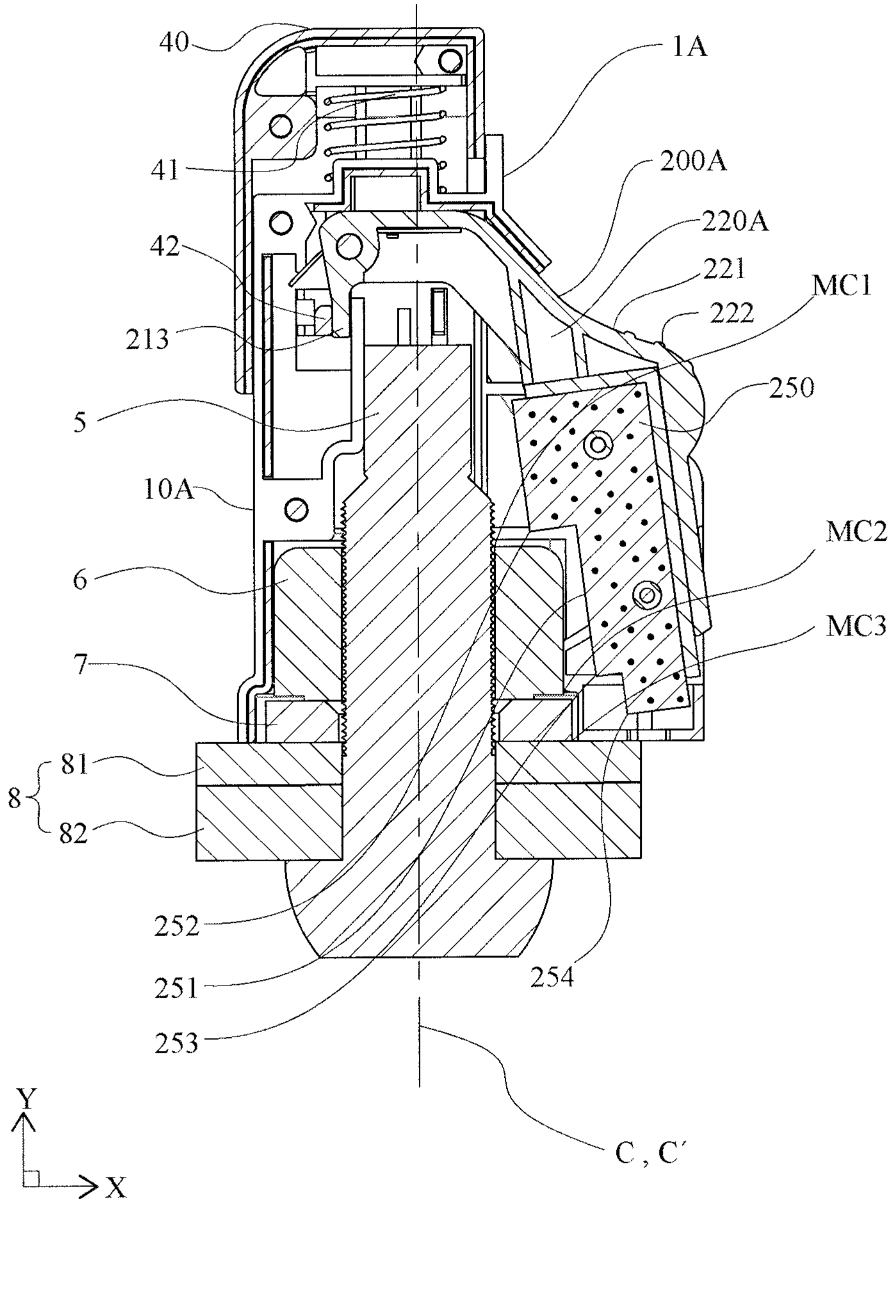
FIG. 4 is a cross-sectional view taken along IV-IV of FIG. 3.

As illustrated in FIGS. 3 and 4, the marking device 1A targets, as the marking objects, fastening members such as a bolt 5, a nut 6, and a washer 7, and a fastened member 81 positioned on the fastening member side of fastened members 8 such as steel primarily fastened by these fastening members, and the marking device 1A is used to put a linear mark continuous on the surface of the marking object. The fastened member 8 of the present embodiment is a total of two, i.e., the fastened member 81 having a plate shape and a fastened member 82 having a plate shape, but is not limited to this, and the fastened member 8 may be three or more members. In the present embodiment, the fastening members are the bolt 5, the nut 6, and the washer 7, but the configuration of the fastening member is not limited to this.

The housing 10A covers a fastening member that is a marking object. As illustrated in FIGS. 2 and 4, in the housing 10A of the present embodiment, a bottom surface opening part 12 having a size that allows the fastening members to be inserted is opening at an end part on a lower side in the figure. The housing 10A covers the fastening members from the bottom surface opening part 12 side. In the housing 10A, a hollow cavity part 11 is formed from the bottom surface opening part 12 toward the upper side in the figure. In the present embodiment, the cavity part 11 has a shape that follows the outer shapes of the bolt 5, the nut 6, and the washer 7 that are primarily fastened, and has an inner diameter slightly larger than the outer shapes of these fastening members. A central axis C' of the cavity part 11 of the embodiment substantially coincides with a central axis C of the bolt 5 accommodated therein. Such the cavity part 11 makes it easy to position to the fastening members. The shape of the cavity part 11 is not limited to this, and a positioning member such as a pin may be provided.

A wall surface of the cavity part 11 is provided with a slit-shaped cutout part 13 in a position where a print surface 251 of a print body 250, described later, faces. The cutout part 13 extends in the central axis C' direction of the cavity part 11 and is formed with a size that allows the print surface 251 to pass therethrough.

Figure 5:
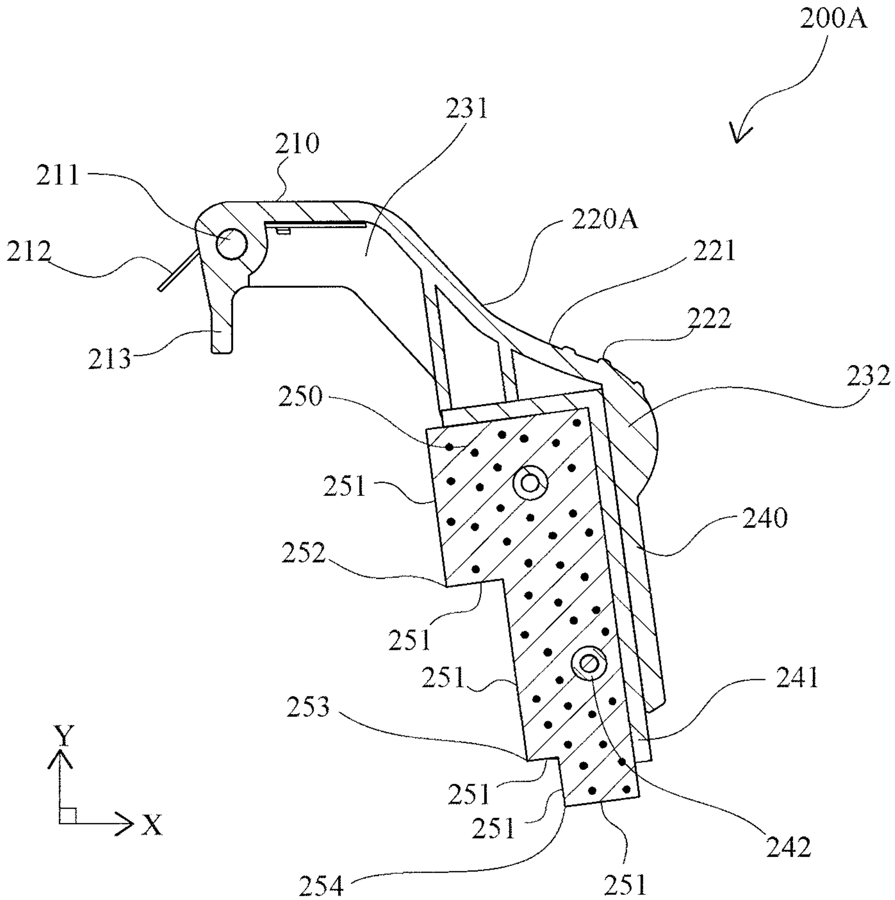
FIG. 5 is an enlarged view of the marking member illustrated in FIG. 2.

The marking member 200A will be described. In the following description, as illustrated in FIGS. 2 and 5, a direction parallel to the central axis C' of the cavity part 11 of the embodiment is a Y axis direction, and a radial direction about the central axis C' of the cavity part 11 is an X axis direction. FIG. 2 is a cross-sectional view taken along an X-Y plane passing through a center 31 of the support shaft 30, which is the swing center of the marking member 200A, and a substantial center in a thickness direction of the print body 250 that puts a mark on the marking object.

As illustrated in FIGS. 2 and 5, the marking member 200A of the present embodiment is an arm-shaped member formed in a substantially dogleg shape as a whole. Specifically, the marking member 200A includes a first bent part 231 bent in a mountain shape on the base end side, and a second bent part 232 bent in a mountain shape in a substantially central position from the first bent part 231 to the end part on the tip end side. The marking member 200A of this example includes a bearing part 211 through which the support shaft 30 can be inserted at the end part on the base end side, and includes a base end side linear part 210 extending linearly in the X axis direction from the bearing part 211 to the first bent part 231, a pressing lever part 220A extending obliquely downward in the figure from the first bent part 231 to the second bent part 232, and a print body support part 240 extending substantially downward in the figure from the second bent part 232 to the end part on the tip end side.

The print body 250 is fixed to the print body support part 240 of the embodiment. The print body 250 of the present embodiment is a felt print body that can be impregnated with a marking ink. The print body 250 includes the print surface 251 formed along a surface shape of the marking object, and can attach a substantially linear mark by contacting the marking object. The ink with which the print body 250 is impregnated is not particularly limited as long as it is an ink that allows marking outdoors. The print body 250 may be configured to include an ink occlusion body that can supply the ink. The shape of the print body 250 will be described later.

The print body 250 of the embodiment is held by a print body reception part 241 including a recess that can hold the print body 250. The print body 250 is fixed to the print body reception part 241 by a fixing pin 242. This print body reception part 241 is attached to the print body support part 240. The fixing method of the print body 250 is not limited to this, and may have another structure.

The ratio of the lengths of main portions of the marking member 200A of the present embodiment is that "from the end part on the base end side to the first bent part 231":"from the first bent part 231 to the second bent part 232":"from the second bent part 232 to the end part on the tip end side" is approximately 2:3:4. While the bending angles of the first bent part 231 and the second bent part 232 are approximately 140 degrees, the shape of the marking member 200A is not limited to this.

As illustrated in FIG. 2, the marking member 200A of the present embodiment is pivotally supported by the housing 10A via the support shaft 30 inserted into the bearing part 211, and is swingable in the inner and outer directions of the housing 10A with the support shaft 30 as a swing center. The marking member 200A of the embodiment is biased radially outward the housing 10 by a biasing member 212. The biasing member 212 of the embodiment is a torsion spring and is attached to the support shaft 30.

The support shaft 30 of the present embodiment is attached to the top surface side of the cavity part 11 inside the housing 10A along a direction perpendicular to the paper surface of FIG. 2. The support shaft 30 of the present embodiment is provided on an extension line of the left inner wall surface of the cavity part 11 in the figure. The print body 250 of the present embodiment is provided on the right side of the cavity part 11 in the figure. The support shaft 30 and the print body 250 are arranged to oppose each other with the cavity part 11 interposed therebetween in longitudinal cross-sectional view.

As illustrated in FIGS. 2 and 4, in the marking device 1A of the present embodiment, the base end side linear part 210 of the marking member 200A is arranged over the radial direction on the top surface side of the cavity part 11, and the pressing lever part 220A is positioned outside the cavity part 11. In the present embodiment, a lever opening part 14 is formed in the housing 10A. A part of the pressing lever part 220A is exposed to the outside of the housing 10A from the lever opening part 14. The operator of the marking device 1A performs marking by manually pressing the exposed part of the pressing lever part 220A. This configuration allows the load applied to the print surface 251 to be freely adjusted by the pressing force of the operator at the time of marking, and therefore the operator can adjust the force according to the ink remaining amount to obtain an appropriate load.

The pressing lever part 220A of the embodiment includes a curved surface part 221 and a projection part 222 on an upper surface in the figure that is an operated part. The curved surface part 221 has a gently curved surface, and becomes a part on which a finger of the operator's hand is placed when the operator presses the marking member 200A toward the inside of the housing 10A. The projection part 222 is formed on the surface of the curved surface part 221, and can serve as an anti-slip measure for the operator's hand. In the embodiment, the three projection parts 222 are provided, but the shape and number of the anti-slip measures are not limited to this.

As illustrated in FIG. 3, the lever opening part 14 of the present embodiment is formed in a size where a part of the pressing lever part 220A and a part of the print body support part 240 are exposed to the outside of the housing 10A, and the opening width is narrowed on the tip end side of the print body support part 240.

Next, the print body 250 will be described. As illustrated in FIGS. 4 and 5, the print body 250 of the present embodiment is a plate-shaped member having a thickness corresponding to the width of a linear mark put on the marking object. The print body 250 is fitted into the recess formed in the print body reception part 241 and held in a state where the print surface 251 in contact with the marking object is exposed. The print body 250 held by the print body reception part 241 is arranged at a position facing the cutout part 13 of the cavity part 11. The print body 250 is displaced in a direction of approaching the marking object by a pressing operation of the marking member 200A, and can cause the print surface 251 to come into contact with the marking object.

The print surface 251 is formed in a shape along an uneven shape of the surface of the marking object, and can be brought into close contact with both the surface extending in the X axis direction and the surface extending in the Y axis direction of the marking object. The print surface 251 of the present embodiment includes a convex corner part. The convex corner part can be brought into close contact with a marked corner part that is a part to which a mark is put in a boundary between marking objects.

Specifically, as illustrated in FIGS. 4 and 5, the print body 250 of the present embodiment has a stepped shape in which the width in the X direction gradually decreases on the print surface 251 side in longitudinal cross-sectional view. Due to this, a plurality of convex corner parts are formed on the print surface 251 side of the print body 250. In the present embodiment, a total of three convex corner parts of a first convex corner part 252, a second convex corner part 253, and a third convex corner part 254 are provided in order from the upper side in the figure.

The marking object of the present embodiment has a total of three marked corner parts of a first marked corner part MC1 in the boundary between the bolt 5 and the nut 6, a second marked corner part MC2 in the boundary between the nut 6 and the washer 7, and a third marked corner part MC3 in the boundary between the washer 7 and the fastened member 81. In the marking device 1A of the present embodiment, the first convex corner part 252 can be brought into close contact with the first marked corner part MC1, the second convex corner part 253 can be brought into close contact with the second marked corner part MC2, and the third convex corner part 254 can be brought into close contact with the third marked corner part MC3 by the marking operation described later.

Next, a lock mechanism that regulates swinging of the marking member 200A in the marking device 1A will be described. It is preferable that the marking device 1A is provided with the lock mechanism because unintended operation of the marking member 200A can be regulated to suppress adhesion of ink stains.

As illustrated in FIGS. 3 and 4, in the marking device 1A of the present embodiment, the upper side in the figure of the housing 10A is provided with a lid-like knock body 40. The knock body 40 of the embodiment is assembled to the housing 10A with an elastic member 41 interposed therebetween, and is movable in the base end direction from the tip end of the fastening member that is the marking object. The elastic member 41 of the embodiment is a compression coil spring, but is not limited to this configuration. The knock body 40 is provided with a regulation part 42 that can regulate swinging of the marking member 200A. In the present embodiment, an engaging piece 213 substantially orthogonal to the base end side linear part 210 is formed in the end part on the base end side of the marking member 200A, and the regulation part 42 and the engaging piece 213 can be engaged with each other.

Figure 6:
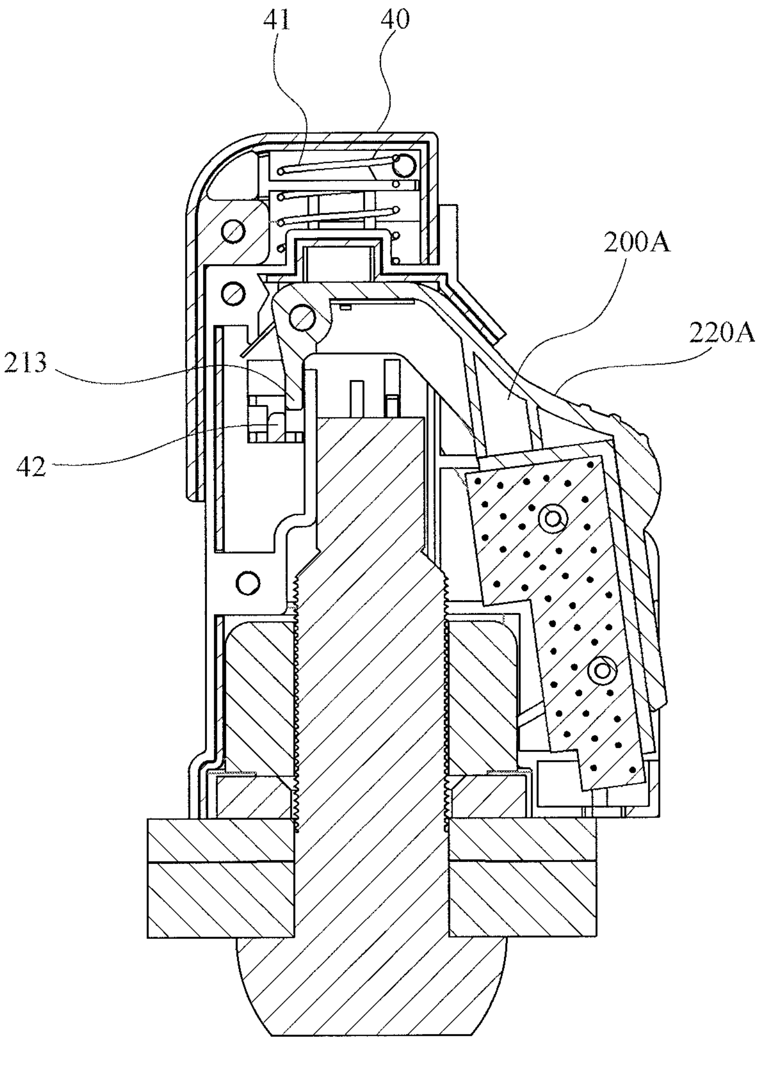
FIG. 6 is a cross-sectional view illustrating a state where a knock body of the marking device in the state illustrated in FIG. 4 is pressed down and regulation of swinging of the marking member is released.
Figure 7:
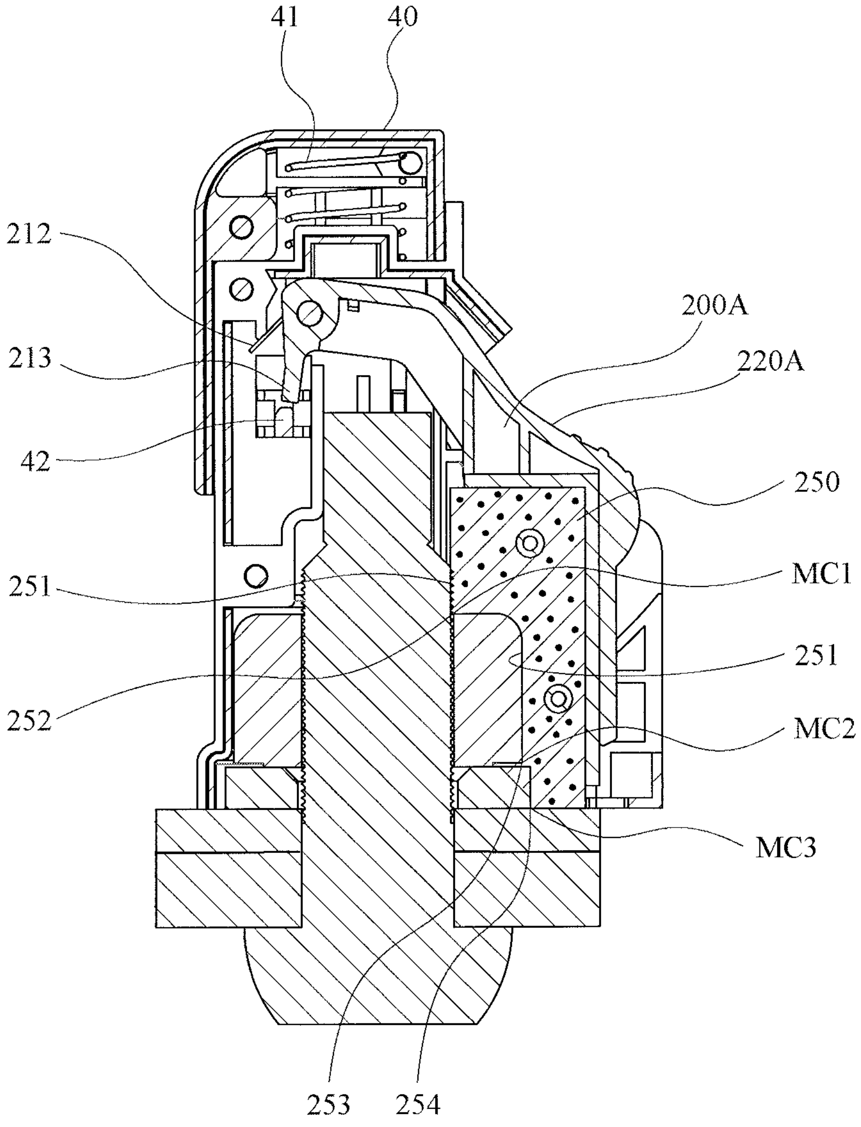
FIG. 7 is a cross-sectional view illustrating a state where the marking member of the marking device in the state illustrated in FIG. 6 is pressed in, and a print body is pressed against the marking object.

In the present embodiment, when the marking device 200A is not in use, as illustrated in FIG. 4, the regulation part 42 is in contact with the left side surface of the engaging piece 213 in the figure, whereby swinging of the marking member 200A is locked. When the operator presses the knock body 40 toward the base end side of the bolt 5 from this state, the regulation part 42 moves toward the base end side of the bolt 5 in accordance with the displacement of the knock body 40 as illustrated in FIG. 6. This allows the engaging piece 213 to move in the left direction in the figure, and lock of the marking member 200A is released. As illustrated in FIG. 7, when the operator presses the pressing lever part 200A of the marking member 220A toward the inside of the housing 10A with the knock body 40 being pressed in, the marking member 200A moves in a direction of approaching the marking object, and the print body 250 comes into contact with the marking object to put a mark.

When the operator releases the pressing against the pressing lever part 220A after performing marking on the marking object, the marking member 200A returns to a non-use state illustrated in FIG. 6 by the biasing force of the biasing member 212. Subsequently, when the operator releases the pressing against the knock body 40, the knock body 40 returns to the non-use state illustrated in FIG. 6 by the elastic member 41, and the swinging of the marking member 200A is brought into a locked state again.

The marking device 1A including the above-described lock mechanism allows the operator to smoothly perform unlocking and marking by a series of operations of pressing the pressing lever part 220A while pressing the knock body 40 with the palm. This makes it possible to perform an operation of putting a mark without moving the position of the hand that has performed the unlock operation, and operability is good. Since the marking member 200A is automatically locked when the operator releases the hand from the lever part 220A and the knock body 40, it becomes unnecessary for the operator to perform an operation of returning the lock mechanism from the unlocked state to the locked state, and convenience is good.

Figure 8:
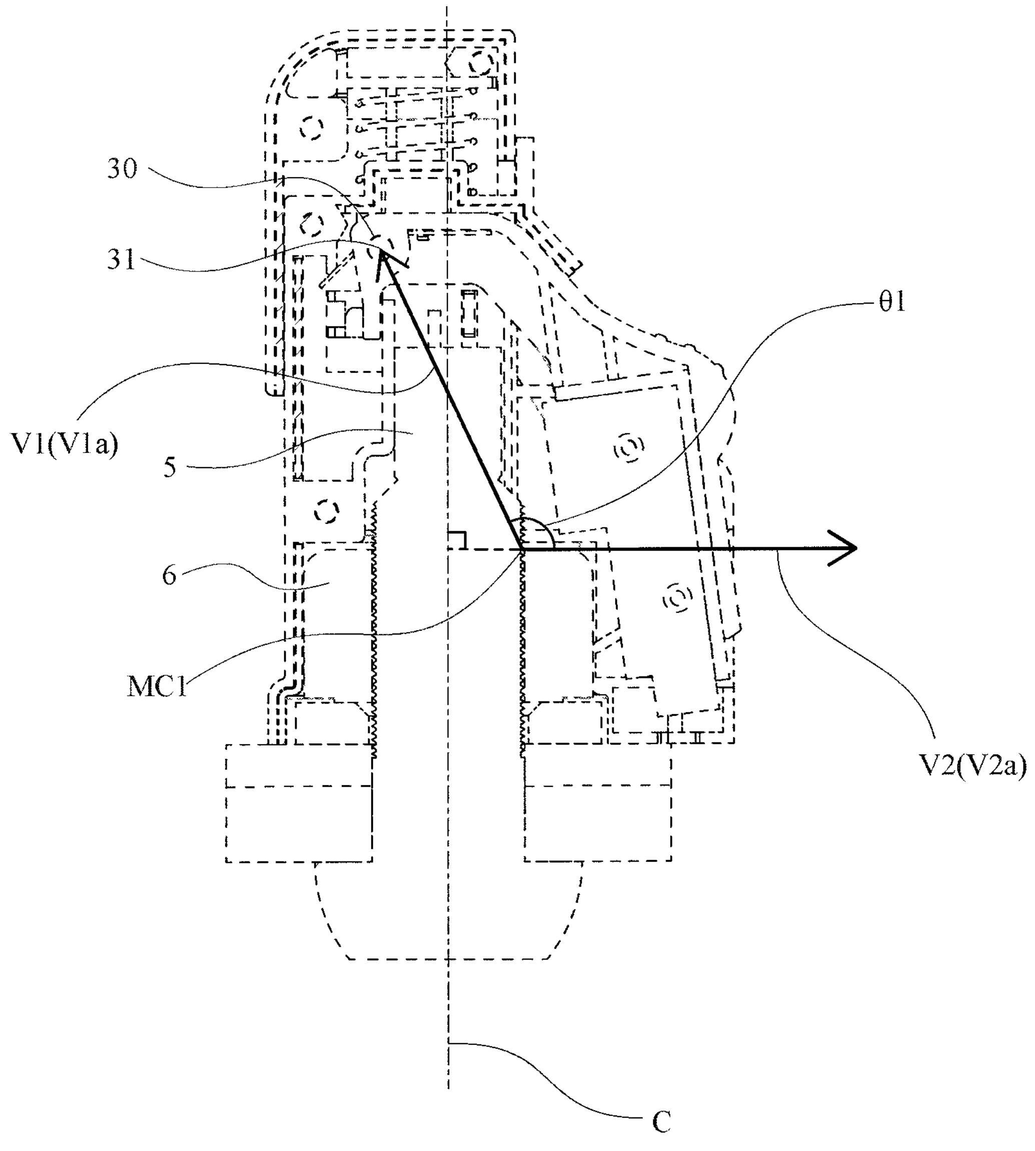
FIG. 8 is a view illustrating an angle formed by the first vector and the second vector having, as a start point, a first marked corner part that is a boundary between a shaft part of the bolt and the top surface of the nut and is a part to which a mark is put in the marking device in the state illustrated in FIG. 4. The marking device, the marking object, and the like are indicated by dotted lines.

Next, a positional relationship between the marking member 200A and the marking object will be described with reference to FIG. 8 as an example. FIG. 8 shows the state that the marking device 1A covers the marking object. In the state shown in FIG. 8, a first vector V1*a* is a vector having the first marked corner part MC1 of the marking object as a start point and the center 31 of the support shaft 30 as an end point. A second vector V2*a* is a vector having the first marked corner part MC1 as a start point and directed to a direction orthogonal to the central axis C of the bolt 5, and away from the bolt 5. An angle θ1 formed by the first vector V1*a* and the second vector V2*a* is what is called an obtuse angle of equal to or greater than 90 degrees and less than 180 degrees. In the example illustrated in FIG. 8, the angle θ1 is about 116 degrees.

Figure 9:
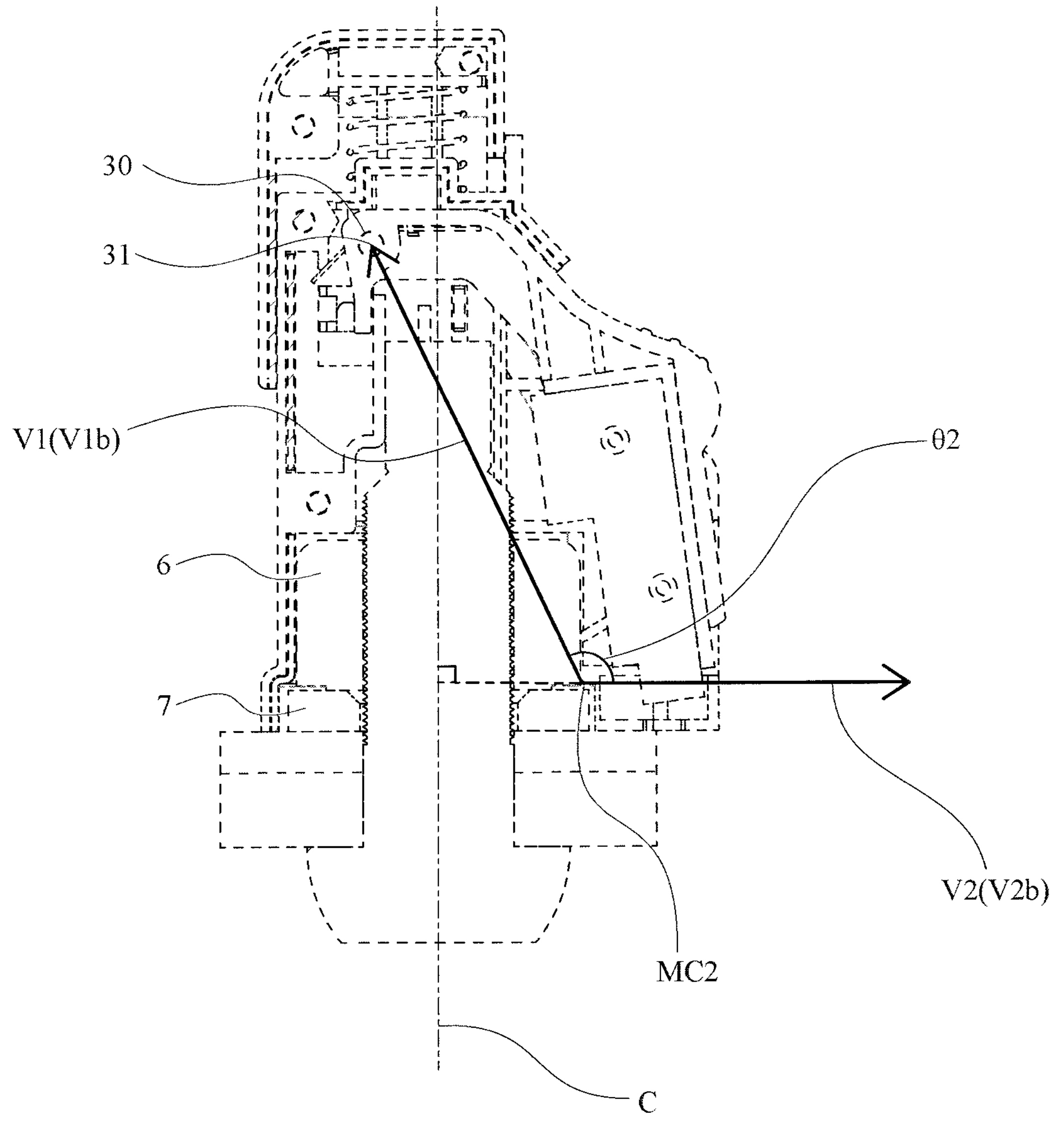
FIG. 9 is a view illustrating an angle formed by the first vector and the second vector having, as a start point, a second marked corner part that is a boundary between the bottom surface of the nut and the top surface of the washer and is a part to which a mark is put in the marking device in the state illustrated in FIG. 4. The marking device, the marking object, and the like are indicated by dotted lines.
Figure 10:
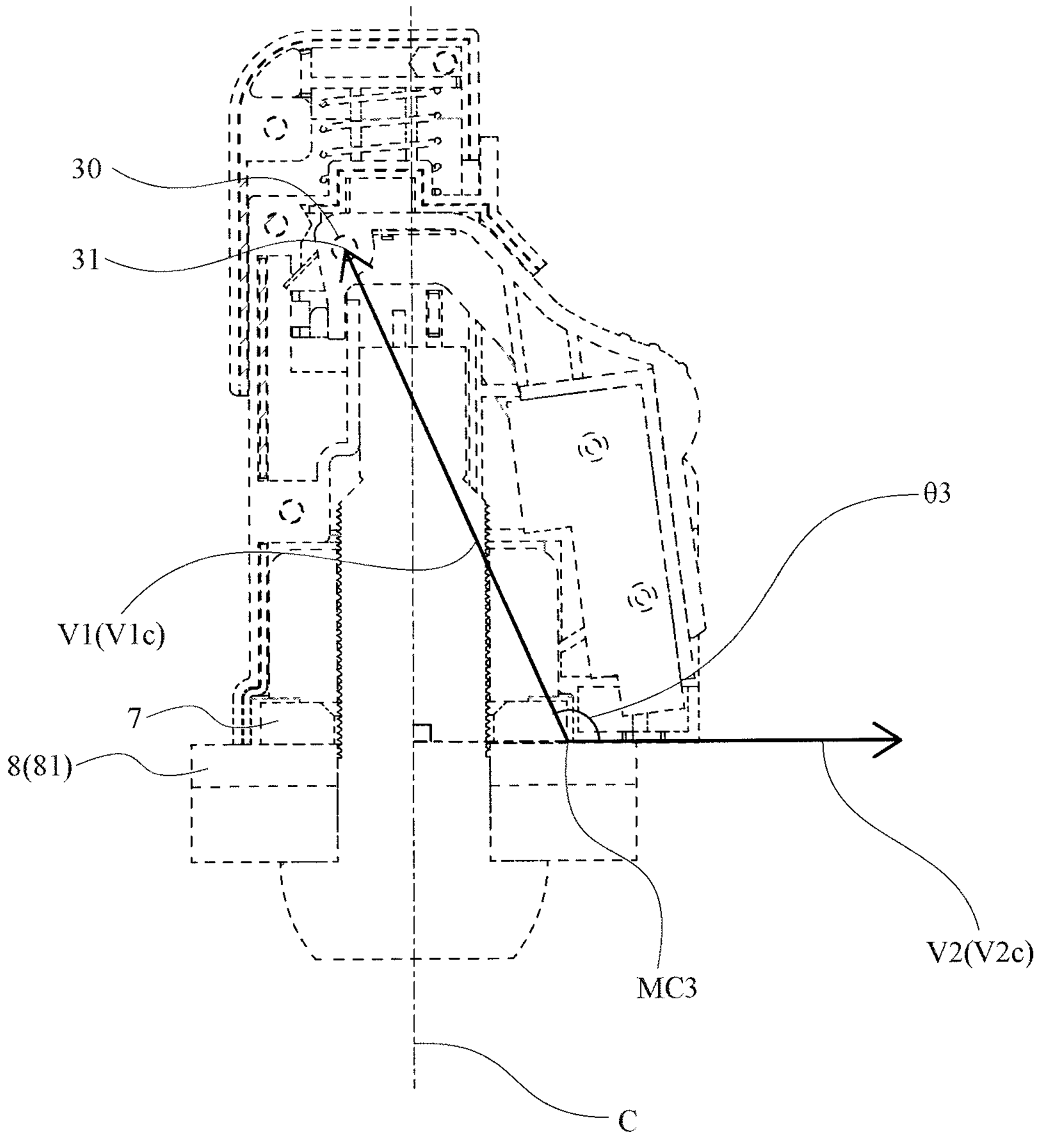
FIG. 10 is a view illustrating an angle formed by the first vector and the second vector having, as a start point, a third marked corner part that is a boundary between the bottom surface of the washer and the surface of the fastened member and is a part to which a mark is put in the marking device in the state illustrated in FIG. 4. The marking device, the marking object, and the like are indicated by dotted lines.

Similarly, in the example illustrated in FIG. 9, an angle θ2 formed by the first vector V1*b* and the second vector V2*b* both having the second marked corner part MC2 as a start point is an obtuse angle. The angle θ2 in this example is about 116 degrees. Also similarly in the example illustrated in FIG. 10, an angle θ3 formed by the first vector V1*c* and the second vector V2*c* both having the third marked corner part MC3 as a start point is an obtuse angle. The angle θ3 in this example is about 113 degrees. In each of the marked corner parts, the angle formed by the first vector V1 and the second vector V2 is preferably from 100 degrees to 150 degrees, and more preferably from 110 degrees to 140 degrees.

With such configuration, as illustrated in FIGS. 6 and 7, the convex corner parts of the print body 250 displaced in accordance with the marking operation come into contact with corresponding marked corner parts, respectively, from the obliquely upper side in the figure, and the convex corner parts and the marked corner parts are firmly brought into close contact with each other. Therefore, it is possible to provide the marking device 1A that can perform clear marking without discontinuity. It is preferable that the marking device 1A has a configuration in which the print surface 251 approaches the marking object from an obliquely upper side in the figure or approaches the marking object at least from a side and is brought in contact with the marking object.

The positional relationship in which the first vector V1 and the second vector V2 form an obtuse angle at each marked corner part is also established at each convex corner part when the print body 250 is at a position where it can come into contact with the marking object. That is, in the marking device 1A of the present invention, when the print body 250 has at least one convex corner part and the print surface 251 is at a position where it can be brought into contact with the marking object accommodated inside the cavity part 11, an angle formed by a vector having the convex corner part as a start point and a swing center of the marking member 200A as an end point and a vector having this convex corner part as a start point and directed to a direction orthogonal to the central axis C' of the cavity part 11 and away from the central axis C' becomes equal to or greater than 90 degrees and less than 180 degrees.

Second Embodiment

Next, the second embodiment of the present invention will be described. The main feature of a marking device 1B of the second embodiment is that marking is performed when a marking member 200B is pressed not by the operator directly manually pressing the marking member 200B but by pressing a holder 43 provided in a housing 10B. Here, differences from the first embodiment will be mainly described, and configurations having the same functions as those of the first embodiment will be denoted by the same reference signs, and description will be omitted.

Figure 11:
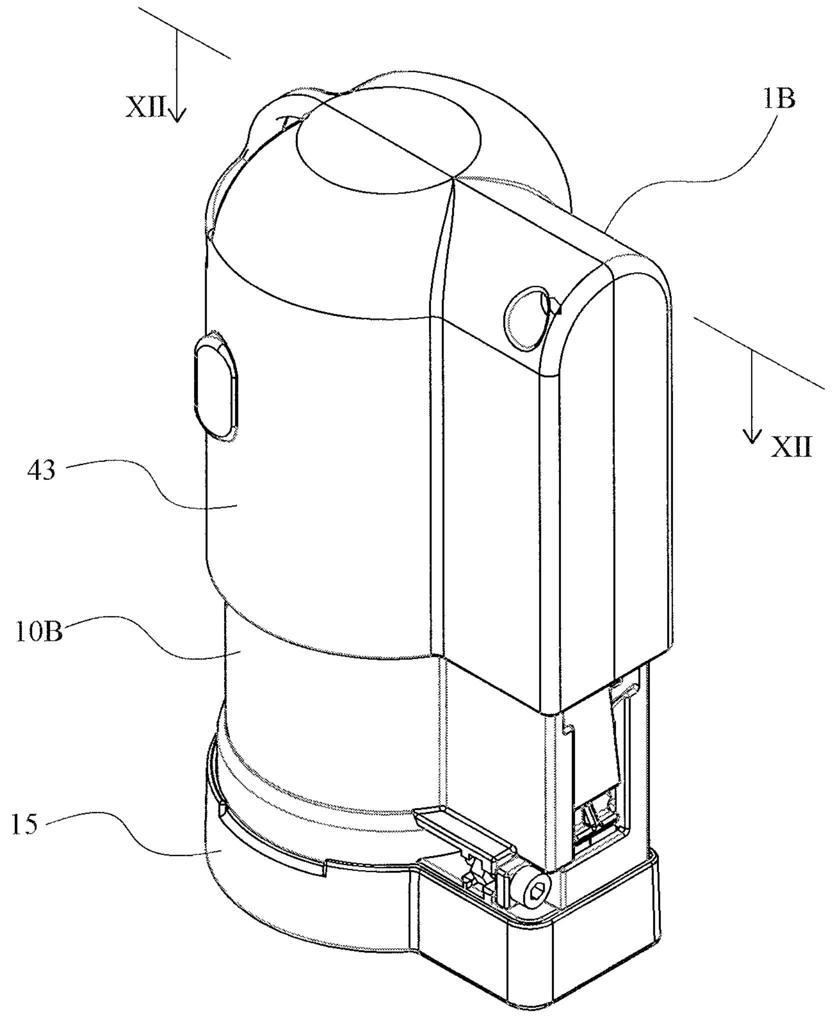
FIG. 11 is a perspective view of a marking device according to a second embodiment.
Figure 12:
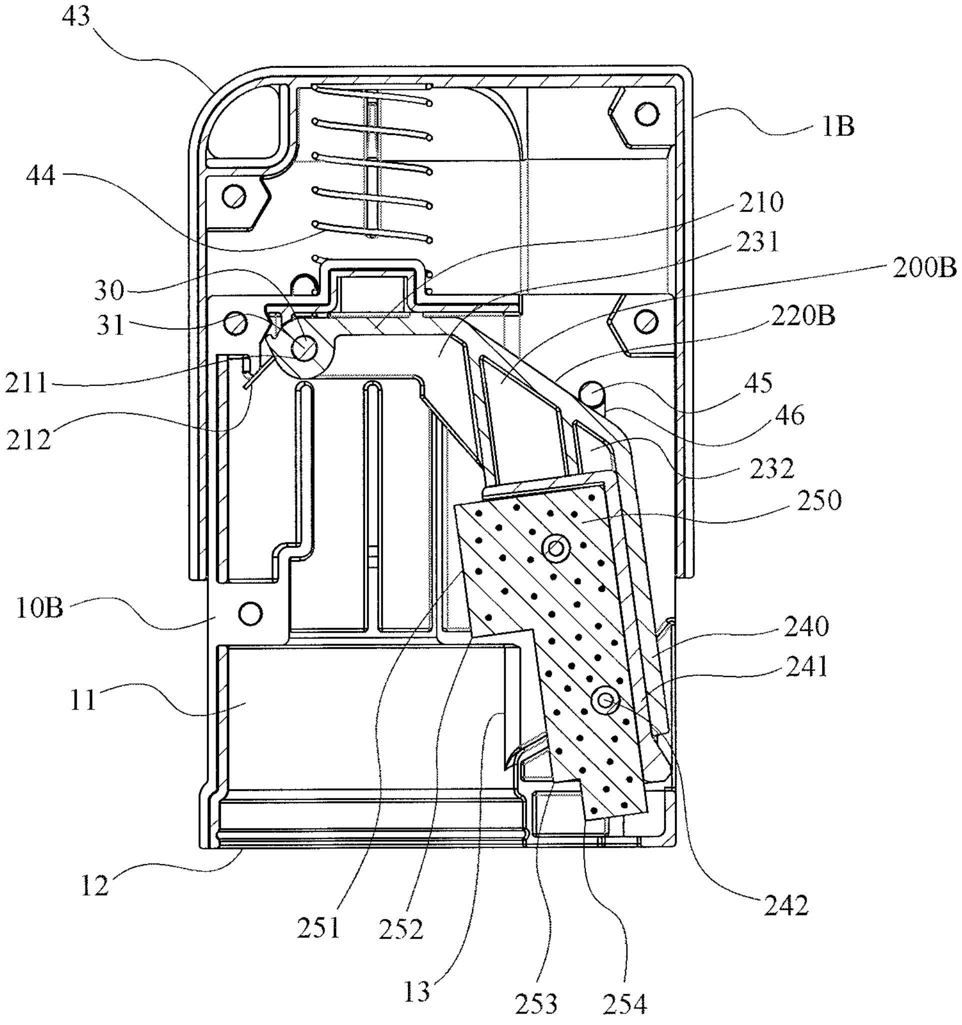
FIG. 12 is a cross-sectional view taken along XII-XII of FIG. 11. However, it illustrates a state where a seal face cap is removed.
Figure 13:
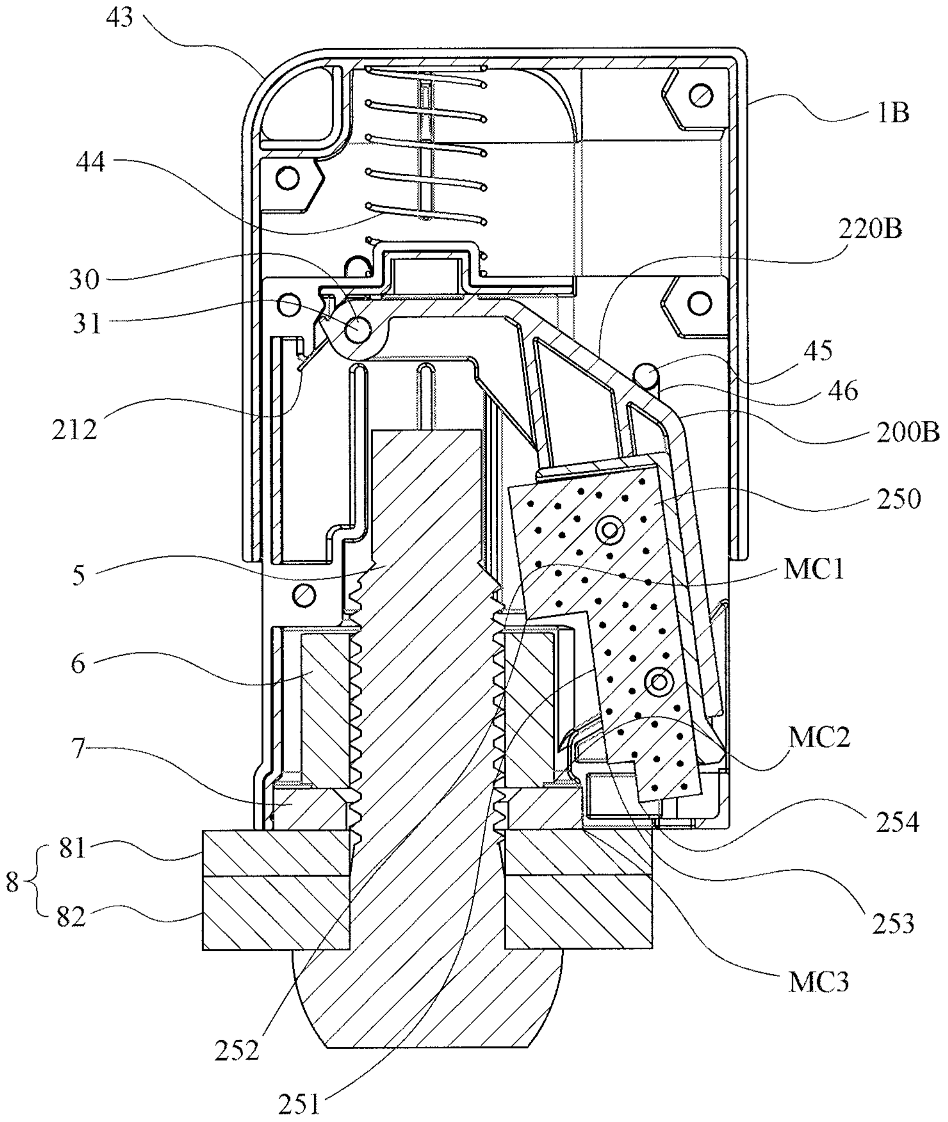
FIG. 13 is a longitudinal cross-sectional view illustrating a state where the marking device illustrated in FIG. 11 is mounted on a bolt that is a marking object.

As illustrated in FIGS. 11 to 13, the marking device 1B of the second embodiment is provided with the holder 43 on the upper side of the housing 10B in the figure. The holder 43 of the embodiment is assembled to the housing 10B with an elastic member 44 interposed therebetween, and is movable in the base end direction from the tip end of the fastening member that is a marking object. The elastic member 44 of the present embodiment is a compression coil spring, and the holder 43 is a lid-like member covering the housing 10B, but is not limited to these configurations.

Figure 14:
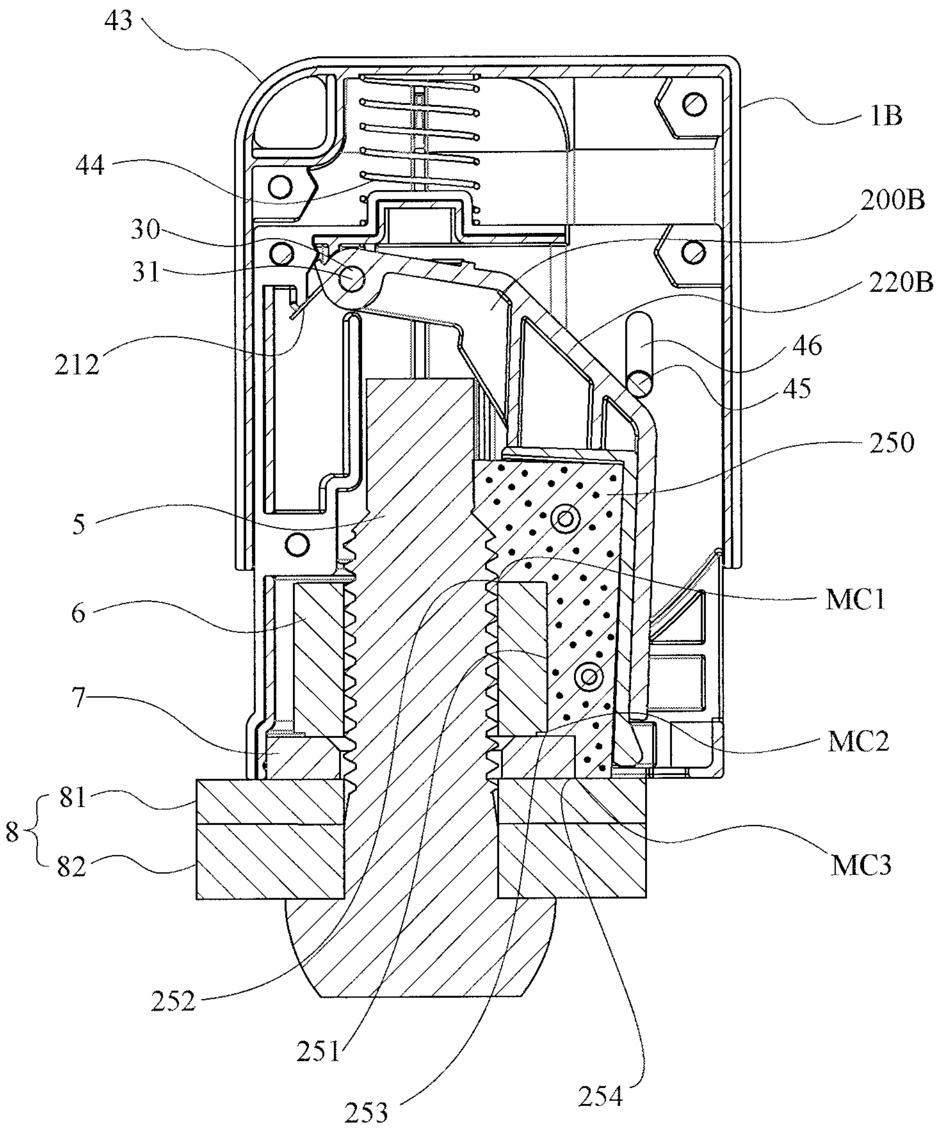
FIG. 14 is a longitudinal cross-sectional view illustrating a state where the marking member of the marking device illustrated in FIG. 13 is pressed down and the print body is pressed against the marking object.

The holder 43 of the embodiment includes a pressing part 45 that can press a pressing lever part 220B of the marking member 200B. As illustrated in FIGS. 13 and 14, the pressing part 45 of the embodiment is a pin inserted into a long hole-shaped guide groove 46 extending in the vertical direction in the figure formed in the housing 10B, and is arranged at a position that allows the pressing part 45 to be brought into contact with an upper surface in the figure of the pressing lever part 220B. The pressing part 45 moves downward in the figure as the holder 43 is pressed from the tip end side of the bolt 5 toward the base end direction, and can press down the pressing lever part 220B downward in the figure. The marking member 200B having been pressed down moves in a direction where the print body 250 approaches the marking object with the support shaft 30 as a swing center, and can put a mark in contact with the marking object.

This configuration allows the operator to perform marking by covering the marking object with the marking device 1B and pressing the holder 43, and allows the labor of the marking operation to be reduced.

In this example, the entire pressing part 45 and the entire pressing lever part 220B are positioned inside the holder 43, but the present invention is not limited to this, and may have a structure in which a part is exposed to the outside of the holder 43. The marking device 1B of the embodiment includes a seal face cap 15 that covers the bottom surface opening part 12, whereby unintended adhesion of ink stains can be suppressed.

While the present invention has been described by taking the embodiments as examples, the present invention is not limited to the above embodiments, and various aspects can be adopted. For example, the marking device 1A of the first embodiment may be provided with the seal face cap 15.

REFERENCE SIGNS LIST

1 marking device
10 housing
11 cavity part
13 cutout part
200 marking member
220 pressing lever part
250 Print body
251 print surface
252 first convex corner part
253 second convex corner part
254 third convex corner part
30 support shaft
40 knock body
42 regulation part
43 holder
45 pressing part
5 bolt
6 nut
7 washer
8 fastened member
MC1 first marked corner part
MC2 second marked corner part
MC3 third marked corner part
C central axis of bolt
C' central axis of cavity part
V1 first vector
V2 second vector

The invention claimed is:

1. A marking device (1A, 1B) that targets, as marking objects, a fastened member (81) and a fastening member (5, 6, 7) fastened to the fastened member (81), the marking device (1A, 1B) comprising:

a housing (10A, 10B) that covers the fastening member (5, 6, 7); and a marking member (200A, 200B) that is coupled to the housing (10A, 10B) via a support shaft (30) and is swingable toward the fastening member (5, 6, 7) with the support shaft (30) as a swing center (31), characterized in that when a vector having, as a start point, a marked corner part (MC1, MC2, MC3) that is a part to which a mark is put in a boundary between the marking objects, and having the swing center (31) as an end point at is a first vector (V1*a*, V1*b*, V1*c*), and a vector having the marked corner part (MC1, MC2, MC3) as a start point, and is directed in a direction orthogonal to a central axis (C) of the fastening member (5) and away from the fastening member (5, 6, 7) is a second vector (V2*a*, V2*b*, V2*c*), an angle formed by the first vector (V1) and the second vector (V2) is equal to or greater than 90 degrees and less than 180 degrees.

2. The marking device (1A) according to claim 1, characterized in that the marking member (200A) includes a protruding part (220A) protruding to an outside of the housing, and a mark is put to the marking object by pressing the protruding part (220A).

3. The marking device (1A) according to claim 2 comprising:

a knock body (40) that is assembled to the housing (10A) with an elastic member (41) interposed therebetween, and movable in a base end direction from a tip end of the fastening member (5, 6, 7); and a regulation part (42) that can regulate operation of the marking member (200A), characterized in that the regulation part (42) regulates rotation of the marking member (200A) when the marking device (1A) is not in use, and when the marking device (1A) is in use, the knock body (40) is pressed in a direction of approaching the fastening member (5, 6, 7), and thus regulation of the regulation part (42) with respect to the marking member (200A) is released.

4. The marking device (1B) according to claim 1 comprising:

a holder (43) that is assembled to the housing (10B) with an elastic member (44) interposed therebetween, and is movable in a base end direction from a tip end of the fastening member (5, 6, 7), characterized in that the holder (43) is provided with a pressing part (45) that can press the marking member (200B), and when the marking device (1B) is in use, the holder (43) is pressed in a direction of approaching the fastening member (5, 6, 7), and thus the pressing part (45) presses the marking member (200B) to put a mark on the marking object.

* * * * *